United States Patent [19]
Griffith et al.

[11] Patent Number: 5,931,621
[45] Date of Patent: Aug. 3, 1999

[54] LOCKING MECHANISM FOR A ROTATABLE FASTENER

[76] Inventors: Gary L. Griffith, 8271 Brentwood Ct., Arvada, Colo. 80005; Woong K. Yoon, 7171 Berthoud St., Westminster, Colo. 80030

[21] Appl. No.: 09/063,163

[22] Filed: Apr. 20, 1998

[51] Int. Cl.$^6$ .................................................. F16B 39/10
[52] U.S. Cl. ........................ 411/255; 411/395; 411/316; 411/296; 411/348
[58] Field of Search ........................... 411/356–359, 395, 411/253–255, 315, 316, 21, 22, 45, 48, 296–299, 354, 348

[56] References Cited

U.S. PATENT DOCUMENTS

| | | | |
|---|---|---|---|
| 3,390,712 | 7/1968 | McKay | 411/348 |
| 4,636,121 | 1/1987 | Miller | 411/253 |
| 4,681,495 | 7/1987 | Crespin | 411/298 |

FOREIGN PATENT DOCUMENTS

| | | | |
|---|---|---|---|
| 970861 | 1/1951 | France | 411/348 |
| 555374 | 8/1943 | United Kingdom | 411/348 |

*Primary Examiner*—Flemming Saether
*Attorney, Agent, or Firm*—Duft, Graziano & Forest, P.C.; James M. Graziano

[57] ABSTRACT

The present locking mechanism for rotatable fastener functions to reliably and inexpensively secure a rotatable fastener in place once it is seated. This is accomplished by the formation of an aperture into the body of the rotatable fastener in a lengthwise direction coaxial with the axis of the cylindrical shaped rotatable fastener. A second aperture is formed in the body of the rotatable fastener perpendicular to the first aperture and intersecting same. A locking pin is placed in the second aperture such that one end of the locking pin is flush with the surface of the body of the rotatable fastener, non-interfering with the operation of the threads formed on the exterior surface of the body of the rotatable fastener. A second end of the locking pin protrudes into the first aperture. A locking post is placed in the first aperture, located above the locking pin and accessible via the open end of the first aperture in the head of the rotatable fastener. A craftsperson uses a tool to force the locking post down into the first aperture to thereby engage the protruding end of the locking pin, forcing the locking pin to move in the second aperture away from the first aperture. The locking pin is thereby driven into the wall of the cylindrical shaped aperture into which the rotatable fastener is threaded and prevents the further rotation of the rotatable fastener in either direction.

8 Claims, 2 Drawing Sheets

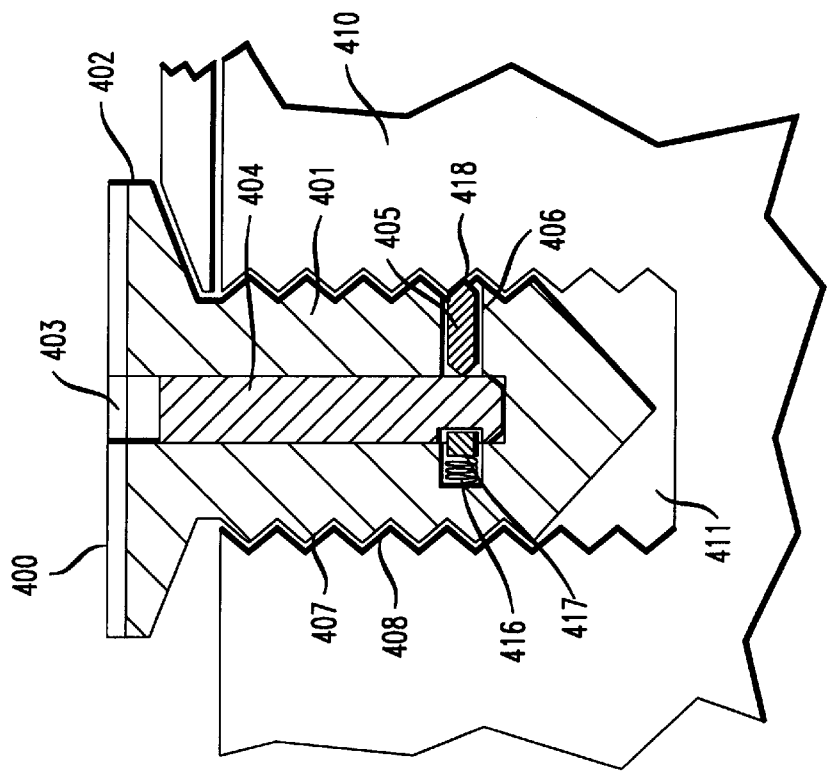
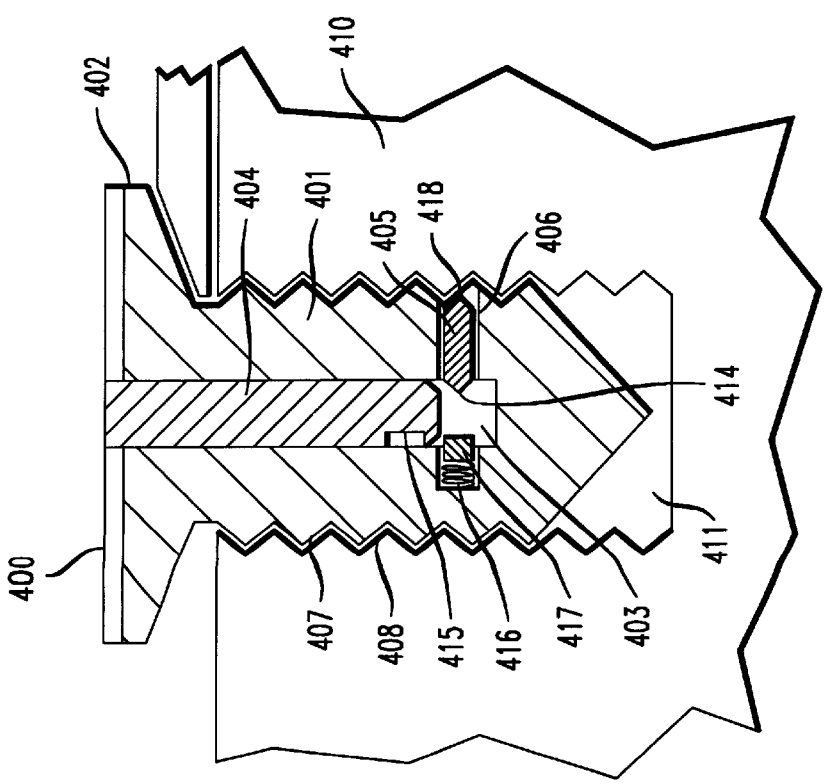

LOCKING MECHANISM FOR A ROTATABLE FASTENER

FIELD OF THE INVENTION

This invention relates to fasteners and, in particular, to a locking mechanism that prevents a rotatable fastener from working loose by "backing out" of its threaded aperture.

PROBLEM

It is a problem in the field of rotatable fasteners to ensure that the fastener will not "back out" or vibrate loose from its secured position. In particular, the term "rotatable fastener" comprises fastener elements, such as bolts and screws, that use threads formed on the body of the fastener element to either engage mating threads that are formed in the wall comprising the circumference of a cylindrical shaped aperture or create "threads" in the material that forms the wall of the cylindrical shaped aperture as the fastener element is threaded into the aperture. In either case, the threaded rotatable fastener is rotated into the cylindrical shaped aperture to a predetermined depth by the force applied to the rotatable fastener by a screwdriver or wrench. At this juncture, the rotatable fastener is "seated" in the cylindrical aperture and typically functions to fasten two elements together.

The problem with such a fastening arrangement is at the rotatable fastener provides no mechanism to prevent vibrations from causing the rotatable fastener to "back out" of the cylindrical shaped aperture. In particular, the vibrations cause the rotatable fastener to rotate in a direction counter to that which was used to seat the rotatable fastener. Thus, the rotatable fastener looses some of its ability to maintain a tight fit to secure the fastened elements together.

One existing solution to this problem is the use of an adhesive applied to the threads of the rotatable fastener (or the walls of the cylindrical shaped aperture) to prevent the rotatable fastener from moving relative to its seated position in the cylindrical shaped aperture. Such an adhesive that is commonly used for this purpose is termed "Loctite" and is commercially available from ??? Corporation. This adhesive does have a number of limitations when used for this purpose. In particular, the Loctite adhesive is expensive to use in that the adhesive itself is expensive and the assembly process requires the expenditure of significant labor. The mating faces to be adhesively bonded must be cleaned and the craftsperson must be trained to properly use the adhesive since it is toxic. In addition, the Loctite adhesive is limited to use at low ambient temperatures and cannot be used in a low air pressure environment (such as a vacuum) or an inhospitable environment where contaminants are present, such as wet or contaminant rich ambient conditions. Thus, there presently does not exist a simple, inexpensive mechanism to secure rotatable fasteners in place, without regard for ambient conditions, exclusive of the use of limited applicability adhesive materials.

SOLUTION

The above described problems are solved and a technical advance achieved by the present locking mechanism for rotatable fastener that functions to reliably and inexpensively secure a rotatable fastener in place once it is seated, regardless of the presence of a hostile ambient conditions. This is accomplished by the formation of an aperture into the body of the rotatable fastener in a lengthwise direction coaxial with the axis of the cylindrical shaped rotatable fastener, from the head of the rotatable fastener to a predetermined depth into the body of the rotatable fastener. A second aperture is formed in the body of the rotatable fastener perpendicular to the first aperture and intersecting same. A locking pin is placed in the second aperture such that one end of the locking pin is flush with the cylindrical surface of the body of the rotatable fastener, non-interfering with the operation of the threads formed on the exterior surface of the body of the rotatable fastener. A second end of the locking pin protrudes into the first aperture. A locking post is placed in the first aperture, located above the locking pin and accessible via an open end of the first aperture in the head of the rotatable fastener. A craftsperson uses a tool to force the locking post down into the first aperture to thereby engage the protruding end of the locking pin, forcing the locking pin to move in the second aperture in a direction away from the first aperture. The locking pin is thereby driven into the wall of the cylindrical shaped aperture into which the rotatable fastener is threaded and prevents the further rotation of the rotatable fastener in either direction. The locking post is maintained in position either by the use of a latching mechanism formed in the first aperture or by the use of friction forces generated by the locking post being forced down the first aperture.

BRIEF DESCRIPTION OF THE DRAWING

FIGS. 3 and 4 illustrate in side cross section view a second embodiment of the locking mechanism for a rotatable fastener in disengaged and engaged states, respectively.

DETAILED DESCRIPTION

Figure 1:
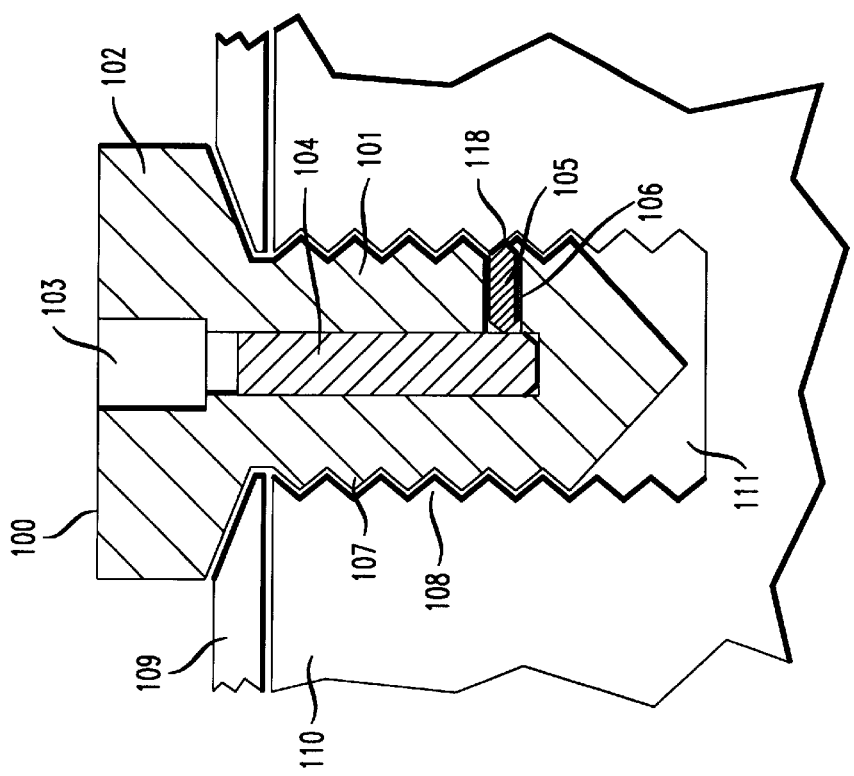
FIGS. 1 and 2 illustrate in side cross section view a first embodiment of the locking mechanism for a rotatable fastener in disengaged and engaged states, respectively.
Figure 2:
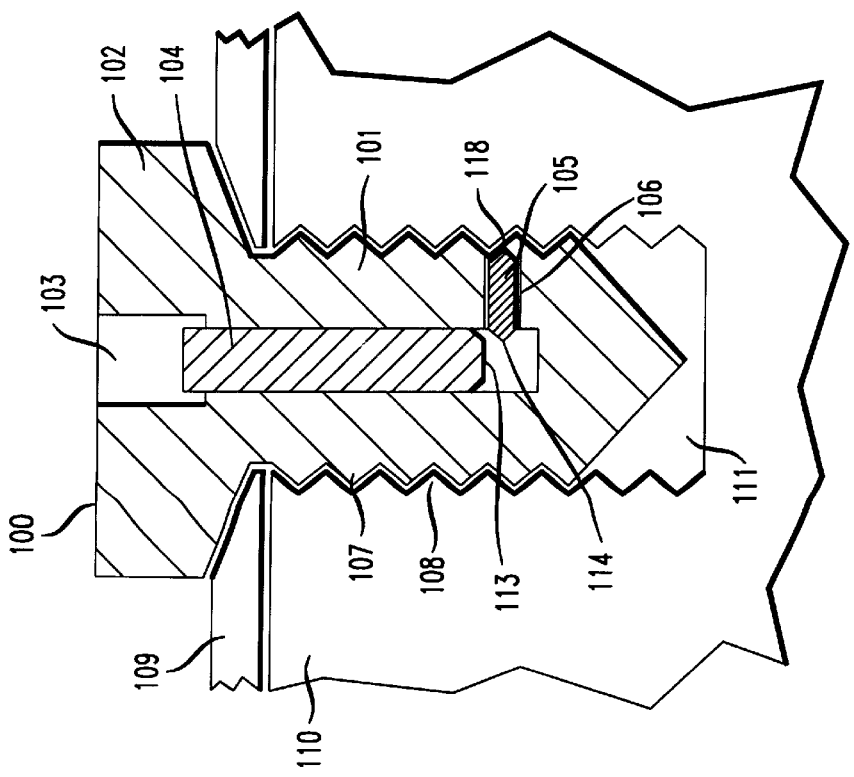

FIGS. 1 and 2 illustrate in side cross section view a first embodiment of the locking mechanism for a rotatable fastener in disengaged and engaged states, respectively. The present locking mechanism for rotatable fastener functions to reliably and inexpensively secure a threaded rotatable fastener 100 in place once it is seated in the mating threaded aperture 111, regardless of the presence of a hostile ambient conditions. An example of such a rotatable fastener is a bolt 100 that is threaded into an aperture 111 that is formed in a block of material 110, which aperture 111 has formed on the walls thereof a set of threads 108 mating with the threads 107 formed on the body 101 of the bolt 100, to secure an element 109 to the block of material 110. The present locking mechanism for rotatable fastener comprises an aperture 103 formed in the body 101 of the rotatable fastener 100 from the head 102 of the rotatable fastener 100 in a lengthwise direction coaxial with the axis of the cylindrical shaped rotatable fastener 100 to a predetermined depth within the body 101 of the rotatable fastener 100. A second aperture 106 is formed in the body 101 of the rotatable fastener 100 perpendicular to the first aperture 103 and intersecting same. A locking pin 105 is placed in the second aperture 106 such that one end 118 of the locking pin 105 is flush with the cylindrical shaped surface of the body 101 of the rotatable fastener 100, non-interfering with the operation of the threads 107 formed on the exterior cylindrical shaped surface of the body 101 of the rotatable fastener 100. A second end 114 of the locking pin 105 protrudes into the first aperture 103. A locking post 104 is placed in the first aperture 103, located above the locking pin 105 and accessible via the open end of the first aperture 103 in the head 102 of the rotatable fastener 100. The "down hole" end of the locking post 104 and the second end 114 of the locking pin 105 are shaped to prevent the shearing off of the protruding second end 114 of the locking pin 105 when the locking post 104 moves in a downward direction to engage the second end 114 of the locking pin 105. The shape of the interacting ends of the locking post 104 and the locking pin 105 are designed to translate the downward motion of the locking post 104 into a force that displaces the locking pin 105 outwardly from the axis of the rotatable fastener 100 through the second aperture 106 to engage the wall of the cylindrical shaped aperture 111 in which the rotatable fastener 100 is seated. In operation, a craftsperson uses a tool, such as a nail set or punch or screwdriver tip, to access the locking post 104 via the open end of the first aperture 103 in the head 102 of the rotatable fastener 102 to thereby force the locking post 104 down into the first aperture 103 to thereby engage the protruding end 114 of the locking pin 105, forcing the locking pin 105 to move in the second aperture 106 away from the first aperture 103. The locking pin 105 is thereby driven into the wall of the cylindrical shaped aperture 111 into which the rotatable fastener 100 is threaded (as shown in FIG. 2) and prevents the further rotation of the rotatable fastener 100 in either direction. The locking post 104 is maintained in position by the use of friction forces generated by the locking post 104 being forced down the first aperture 103.

FIGS. 3 and 4 illustrate in side cross section view a second embodiment of the locking mechanism for a rotatable fastener 400 in disengaged and engaged states, respectively. This embodiment illustrates the use of the present locking mechanism for a rotatable fastener in a screw 400, where the locking pin 404 is maintained in place by the operation of a latching mechanism. As with the bolt noted above, this embodiment uses a cylindrical-shaped threaded rotatable fastener 400 that is threaded into an aperture 411 that is formed in a block of material 410 by the rotation of the rotatable fastener 400 to create a set of threads 408 that mate with the threads 407 formed on the body 401 of the screw 400. The present locking mechanism for rotatable fastener comprises an aperture 403 formed in the body 401 of the rotatable fastener 400 from the head 402 of the rotatable fastener 400 in a lengthwise direction coaxial with the axis of the cylindrical shad rotatable fastener 400 to a predetermined depth within the body 401 of the rotatable fastener 400. A second aperture 406 is formed in the body 401 of the rotatable fastener 400 perpendicular to the first aperture 403 and intersecting same. A locking pin 405 is placed in the second aperture 406 such that one end 418 of the locking pin 405 is flush with the cylindrical shaped surface of the body 401 of the rotatable fastener 400, non-interfering with the operation of the threads 407 formed on the exterior cylindrical shaped surface of the body 401 of the rotatable fastener 400. A second end 414 of the locking pin 405 protrudes into the first aperture 403. A locking post 404 is placed in the first aperture 403, located above the locking pin 405 and accessible via the open end of the first aperture 403 in the head 402 of the rotatable fastener 400. The "down hole" end of the locking post 404 and the second end 414 of the locking pin 405 are shaped to prevent the shearing off of the protruding second end 414 of the locking pin 405 when the locking post 404 moves in a downward direction to engage the second end 414 of the locking pin 405. The shape of the interacting ends of the locking post 404 and the locking pin 405 are designed to translate the downward motion of the locking post 404 into a force that displaces the locking pin 405 outwardly from the axis of the rotatable fastener 400 through the second aperture 406 to engage the wall of the cylindrical shaped aperture 411 in which the rotatable fastener 400 is seated. In operation, a craftsperson uses a tool, such as a nail set or punch or screwdriver tip, to access the locking post 404 via the open end of the first aperture 403 in the head 402 of the rotatable fastener 402 to thereby force the locking post 404 down into the first aperture 403 to thereby engage the protruding end 414 of the locking pin 405, forcing the locking pin 405 to move in the second aperture 406 away from the first aperture 403. The locking pin 405 is thereby driven into the wall of the cylindrical shaped aperture 411 into which the rotatable fastener 400 is threaded (as shown in FIG. 4) and prevents the further rotation of the rotatable fastener 400 in either direction.

In this embodiment, the latching mechanism comprises a feature 415 formed on the body of the locking post 404, that mates with a protrusion element formed in the wall of the first aperture 403. In particular, the second aperture 406 formed in the body 401 of the rotatable fastener 400 can be extended through the first aperture 403 and into the wall of the first aperture 403 to form an extension of the second aperture 406 so the second aperture 406 spans the opening presented by the first aperture 403. Into this extension of the second aperture 406, a protrusion element, such as spring 416 and plug 417 are mounted. As the locking post 403 moves down the length of the first aperture 403 from the head 402 of the rotatable fastener 400, the exterior surfaces of the locking post 404 force the plug 417 back into the extension of the second aperture 406, compressing the spring 416 located therein. Once the feature 415 formed in the body of the locking post 404 is located opposite the plug 417, the spring 416 forces the plug 417 into this feature 415 to thereby block any further movement of the locking post 404 in the first aperture 403, in either direction. This latching mechanism thereby ensures that the locking pin 405 cannot move back into the second aperture 406, since the locking post 404 seals the end of the second aperture 406.

SUMMARY

The locking mechanism for a rotatable fastener thereby provides a simple, inexpensive and reliable system for mechanically securing the threaded cylindrical-shaped rotatable fastener in place once the rotatable fastener is seated in its mating threaded cylindrical-shaped aperture. The locking mechanism is simple to operate and is effective in a wide variety of ambient conditions.

What is claimed:

1. A locking cylindrical-shaped rotatable fastener element for rotatable insertion into a receiving aperture having a cylindrical shaped wall, comprising:

a cylindrical shaped body having a set of threads formed on the circumference of said cylindrical shaped body for enabling controlled rotation of said locking rotatable fastener element into said receiving aperture; and means, located within said cylindrical shaped body, operable to permanently mechanically prevent rotation of said cylindrical shaped body in said receiving aperture, once said locking rotatable fastener element is rotatably inserted into said receiving aperture, comprising:

locking pin means located in said cylindrical shaped body in a position to be non-interfering with the operation of said set of threads formed on the circumference of said cylindrical shaped body when in a first state, and in a position to mechanically engage said cylindrical shaped wall of said receiving aperture when in a second state, locking post means, located in said in said cylindrical shaped body in a position to be non-interfering with movement of said locking pin means in said cylindrical shaped body when in a first state, and in a position to mechanically engage said locking pin means into said second state when in a second state, first aperture, formed substantially coaxial with the axis of said cylindrical shaped body from a head of said cylindrical shaped body to a predetermined distance along a lengthwise dimension of said cylindrical shaped body, for receiving said locking post means and enabling movement of said locking post means along said axis of said cylindrical shaped body;

means located in said cylindrical shaped body operable to permanently mechanically prevent movement of said locking post means once said locking post means is positioned in said second state, comprising:

second aperture, formed in said cylindrical shaped body substantially perpendicular to said axis of said cylindrical shaped body and intersecting said first aperture, for receiving said locking pin means and enabling movement of said locking pin means perpendicular to said axis of said cylindrical shaped body latch means for permanently engaging a feature in said locking post means to prevent movement of said locking post means when said locking post means is positioned in said second state, said latch means and the engaging feature in the locking post being configured such that once engaged the locking post cannot move from said second state.

2. The locking rotatable fastener element of claim 1 wherein said locking post means is operable to translate down a length of said first aperture away from said head of said cylindrical shaped body to engage said locking pin means to move said locking pin means through said second aperture perpendicular to said axis of said cylindrical shaped body to mechanically engage said locking pin means with said wall of said receiving aperture and prevent disengagement of said locking pin means with said wall of said receiving aperture.

3. The locking rotatable fastener element of claim 1 wherein said locking pin means comprises an elongated body having a chisel point formed at an end to engage said cylindrical shaped wall of said receiving aperture.

4. The locking rotatable fastener element of claim 1 wherein said latch means comprises:

spring means mounted in a hole formed in a wall of said first aperture; and plug means attached to an end of said spring means closest to said first aperture for permanently engaging said feature in said locking post means when said feature is located juxtaposed to said hole.

5. A locking cylindrical-shaped rotatable fastener element for rotatable insertion into a receiving aperture having a cylindrical shaped wall, comprising:

a cylindrical shaped body having a set of threads formed on the circumference of said cylindrical shaped body for enabling controlled rotation of said locking rotatable fastener element into said receiving aperture; and means, located within said cylindrical shaped body, operable to mechanically prevent rotation of said cylindrical shaped body in said receiving aperture, once said locking rotatable fastener element is rotatably inserted into said receiving aperture, comprising:

first aperture, formed substantially coaxial with the axis of said cylindrical shaped body from a head of said cylindrical shaped body to a predetermined distance along a lengthwise dimension of said cylindrical shaped body;

second aperture, formed in said cylindrical shaped body substantially perpendicular to said axis of said cylindrical shaped body, intersecting said first aperture and exiting on a cylindrical shaped exterior surface of said cylindrical shaped body; and means, operable in said first and said second apertures, for mechanically engaging said cylindrical shaped wall of said receiving aperture to mechanically prevent rotation of said cylindrical shaped body in said receiving aperture, once said locking rotatable fastener element is rotatably inserted into said receiving aperture, comprising:

locking pin means located in said second aperture in a position to be non-interfering with the operation of said set of threads formed on the circumference of said cylindrical shaped body when in a first state, and in a position to mechanically engage said cylindrical shaped wall of said receiving aperture when in a second state, locking post means located in said in said first aperture in a position to be non-interfering with movement of said locking pin means in said second aperture when in a first state, and in a position to mechanically engage said locking pin means into said second state when in a second state, and means located in said cylindrical shaped body operable to permanently mechanically prevent movement of said locking post means once said locking post means is positioned in said second state, comprising:

latch means located in said first aperture for permanently engaging a feature in said locking post means to prevent movement of said locking post means when said locking post means is in said second state, said latch means and the engaging feature in the locking post being configured such that once engaged the locking post cannot move from said second state.

6. The locking rotatable fastener element of claim 5 wherein said locking post means is operable to translate down a length of said first aperture away from said head of said cylindrical shaped body to engage said locking pin means to move said locking pin means through said second aperture perpendicular to said axis of said cylindrical shaped body to mechanically engage said locking pin means with said wall of said receiving aperture and prevent disengagement of said locking pin means with said wall of said receiving aperture.

7. The locking rotatable fastener element of claim 5 wherein said locking pin means comprises an elongated body having a chisel point formed at an end to engage said cylindrical shaped wall of said receiving aperture.

8. The locking rotatable fastener element of claim 5 wherein said latch means comprises:

spring means mounted in a hole formed in a wall of said first aperture; and plug means attached to an end of said spring means closest to said first aperture for permanently engaging said feature in said locking post means when said feature is located juxtaposed to said hole.

* * * * *

UNITED STATES PATENT AND TRADEMARK OFFICE
CERTIFICATE OF CORRECTION

PATENT NO : 5,931,621
DATED : August 3, 1999
INVENTOR(S) : Gary L. Griffith and Woong K. Yoon It is certified that error appears in the above-identified patent and that said Letters Patent is hereby corrected as shown below: On the title page: Item [73]

Assignee: Lucent Technologies Inc., Murray Hill, New Jersey

Signed and Sealed this

Twentieth Day of June, 2000

*Attest:*

Q. TODD DICKINSON

*Attesting Officer*  *Director of Patents and Trademarks*